US012099379B2

United States Patent
G (10) Patent No.: US 12,099,379 B2
(45) Date of Patent: *Sep. 24, 2024

(54) PREEMPTIVE WAKEUP CIRCUIT FOR WAKEUP FROM LOW POWER MODES

(71) Applicant: TEXAS INSTRUMENTS INCORPORATED, Dallas, TX (US)

(72) Inventor: Anand Kumar G, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,324

(22) Filed: Dec. 12, 2022

(65) Prior Publication Data

US 2023/0113657 A1 Apr. 13, 2023

Related U.S. Application Data

(63) Continuation of application No. 16/519,655, filed on Jul. 23, 2019, now Pat. No. 11,567,527.

(51) Int. Cl.
*G06F 1/00* (2006.01)
*G06F 1/14* (2006.01)
(Continued)

(52) U.S. Cl.
CPC .............. *G06F 1/14* (2013.01); *G06F 1/3225* (2013.01); *G06F 1/3237* (2013.01); *G06F 1/3203* (2013.01); *G06F 1/3287* (2013.01)

(58) Field of Classification Search
CPC ......... G06F 1/14; G06F 1/3225; G06F 1/3237
(Continued)

(56) References Cited

U.S. PATENT DOCUMENTS 5,758,137 A * 5/1998 Armstrong, Jr. .......... G06F 1/14
713/502
6,304,979 B1 * 10/2001 Bacigalupo ............... G06F 1/10
713/601
(Continued)

FOREIGN PATENT DOCUMENTS

| CN | 108475095 A | 8/2018 |
|---|---|---|
| WO | 2006138687 A2 | 12/2006 |

OTHER PUBLICATIONS

International Search Report for PCT/US2020/042723 mailed Oct. 22, 2020.
(Continued)

*Primary Examiner* — Volvick Derose
(74) *Attorney, Agent, or Firm* — Michael T. Gabrik; Frank D. Cimino (57) ABSTRACT

A circuit comprises a power controller, a real-time clock (RTC) sub-system, and a processing sub-system. The RTC sub-system includes an alarm register storing a predetermined time for a task, and provides an early warning countdown and a scheduled event signal. The processing sub-system includes a processor, a preemptive wakeup circuit, and a component coupled to the processor and configured to execute the task with the processor. The preemptive wakeup circuit comprises a selector logic circuit, a comparator, and a wakeup initiation circuit. The selector logic circuit receives latency values indicative of wakeup times for a clock generator and the component, and outputs a longest wakeup time to the comparator, which indicates when the early warning countdown and the longest wakeup time are equal. The wakeup initiation circuit generates a clock request and disables the sleep mode indicator. The power controller provides a clock signal and wakes the component.

20 Claims, 4 Drawing Sheets

(51) Int. Cl.
  *G06F 1/3225* (2019.01)
  *G06F 1/3237* (2019.01)
  *G06F 1/3203* (2019.01)
  *G06F 1/3287* (2019.01)
(58) Field of Classification Search
  USPC ........................................................ 713/322
  See application file for complete search history.

(56) References Cited

U.S. PATENT DOCUMENTS

| | | | |
|---|---|---|---|
| 6,674,821 B1 * | 1/2004 | Mejyr | G06F 1/3215 |
| | | | 375/354 |
| 6,990,594 B2 | 1/2006 | Kim | |
| 8,775,838 B2 | 7/2014 | Lee et al. | |
| 10,296,077 B2 | 5/2019 | Jouin et al. | |
| 2002/0174371 A1 * | 11/2002 | Padawer | H04W 52/0216 |
| | | | 713/320 |
| 2006/0288240 A1 * | 12/2006 | Kardach | G06F 1/3237 |
| | | | 713/300 |
| 2007/0124608 A1 * | 5/2007 | Knowlson | G06F 1/325 |
| | | | 713/300 |
| 2008/0010563 A1 * | 1/2008 | Nishimura | G06F 9/4812 |
| | | | 714/E11.003 |
| 2008/0294928 A1 | 11/2008 | Jain et al. | |
| 2008/0307248 A1 * | 12/2008 | Amano | G06F 1/08 |
| | | | 718/107 |
| 2009/0319817 A1 * | 12/2009 | Kallam | G06F 1/3203 |
| | | | 713/500 |
| 2011/0283288 A1 * | 11/2011 | Kurata | G06F 9/3851 |
| | | | 718/103 |
| 2013/0198540 A1 | 8/2013 | Lee et al. | |
| 2013/0290757 A1 * | 10/2013 | Barlow | G06F 1/3287 |
| | | | 713/323 |
| 2013/0311797 A1 * | 11/2013 | Ahmad | G06F 1/3209 |
| | | | 713/320 |
| 2015/0095688 A1 * | 4/2015 | Sugumar | G06F 13/4273 |
| | | | 713/500 |
| 2016/0302255 A1 * | 10/2016 | Takeda | H04L 67/12 |
| 2017/0185136 A1 | 6/2017 | Sundaram et al. | |
| 2021/0026399 A1 * | 1/2021 | G | G06F 1/3237 |
| 2021/0076323 A1 * | 3/2021 | Sun | H04W 52/0216 |
| 2022/0264453 A1 * | 8/2022 | Nam | H04W 52/0241 |

OTHER PUBLICATIONS

Extended European Search Report, European Patent Application No. 20843505.7, Aug. 25, 2022, 9 pages.

* cited by examiner

PREEMPTIVE WAKEUP CIRCUIT FOR WAKEUP FROM LOW POWER MODES

This application is a continuation of U.S. patent application Ser. No. 16/519,655, filed Jul. 23, 2019, which is hereby incorporated by reference herein in its entirety.

BACKGROUND

Many electronic devices implement low power modes for components and sub-systems within the devices to conserve power. However, the sub-systems may be scheduled to perform tasks at predetermined times in the future. Resources needed to perform the scheduled real-time task such as oscillators, clocks, static random access memory (SRAM), and the like may not be active or available from the low power mode for the processing sub-system to use to execute the time-critical task. This leads to latency overhead and imprecisely timed performance of the time-critical task. Accordingly, for real-time tasks, it may be beneficial to wake up the sub-systems and necessary resources from low power modes in advance of the scheduled real-time task.

Preemptive wakeup can be handled in software, but requires complex software sequences to manage the state of the hardware resources needed for scheduled events. This can increase the power consumption in wakeup sequences from low power modes. Some systems achieve precise wakeup by implementing two system real-time clock channels for each event, one for the early wakeup event and one for the scheduled event itself. However, the number of channels needed to accommodate scheduled events for multiple processing unit sub-systems increases the operating and component cost for the system.

SUMMARY

In one example, an electronic circuit comprises a processing sub-system, a power controller coupled to the processing sub-system, and a real-time clock (RTC) sub-system coupled to the processing sub-system. The RTC sub-system includes an alarm register to store a predetermined time to execute a task, and is configured to provide and early warning countdown based on the predetermined time and a scheduled event signal at the predetermined time. The processing sub-system includes a processor coupled to the RTC sub-system to receive the scheduled event signal, a component coupled to the processor and configured to execute the task in conjunction with the processor, and a preemptive wakeup circuit coupled to the RTC sub-system to receive the early warning countdown. The preemptive wakeup circuit is configured to generate a clock request signal and disable a sleep mode indicator based on the early warning countdown. The power controller is configured to provide a clock signal and wake the component based on the sleep mode indicator.

In some implementations, the RTC sub-system comprises a real-time clock for generating the scheduled event signal and the early warning countdown. The processor is further configured to write the predetermined time to the alarm register. In some implementations, the RTC sub-system comprises a plurality of alarm registers, each of which is configured to store a predetermined time for a unique task to be executed, and the processor is further configured to write to a subset of the plurality of alarm registers. In some embodiments, the RTC sub-system is further coupled to the power controller, and configured to clear the alarm register or the subset of the plurality of alarm registers in response to a processing sub-system reset signal from the power controller. In some implementations, the early warning countdown is twelve bits wide, and the RTC sub-system decrements the countdown based on a first clock frequency for a first portion of time and based on a second, higher clock frequency for a second, shorter portion of time.

In some examples, the preemptive wakeup circuit comprises a selector logic circuit, a comparator coupled to the selector logic circuit, and a wakeup initiation circuit coupled to the comparator. The selector logic circuit receives latency values indicative of respective wakeup times for the component and a clock generator, and receives a selector signal indicating which latency value is the largest, corresponding to the longest wakeup time, for the selector logic circuit to output. In some implementations, the selector logic circuit is a multiplexor. The comparator outputs a signal indicating a value of the early warning countdown from the RTC sub-system is equal to the largest latency value. The wakeup initiation circuit generates the clock request signal and disables the sleep mode indicator based on the comparator output.

BRIEF DESCRIPTION OF THE DRAWINGS

For a detailed description of various examples, reference will now be made to the accompanying drawings in which.

DETAILED DESCRIPTION

The example systems described herein offer low power and cost effective preemptive wakeup of processing sub-systems and associated resources from low power modes. A system real-time clock included in an example system includes multiple channels, such that each processing unit sub-system can own and program scheduled wakeup events into a plurality of channels. Each unique processing unit sub-system can have multiple pending scheduled wakeup events at a time. The system real-time clock communicates with each processing unit sub-system using an early warning bus. In some examples, the same early warning bus from the system real-time clock to a particular processing unit sub-system can be used for all of the respective processing unit sub-system's scheduled events, rather than a unique early warning bus for each channel owned and programmed by the particular processing unit sub-system. In one such example, a system including four processing unit sub-systems includes four early warning buses for the system real-time clock to communicate over, one for each processing unit sub-system.

A preemptive wakeup circuit included in the processing unit sub-system begins waking up components in response to a countdown on the early warning bus. In an example where the wakeup circuit begins waking the components based on the component with the longest wakeup time, the circuit includes a selector logic circuit, a comparator, and a wakeup initiation sub-circuit. The selector logic circuit can be a multiplexor, and have inputs to receive latency values indicative of wakeup times for resources used by the processing unit sub-system and a selector signal. The selector signal indicates which latency value is the largest, corresponding to the longest wakeup time, for resources needed to execute the scheduled event. The comparator compares the largest latency value to a value of the early warning countdown from the system real-time clock, and indicates when the countdown equals the largest latency value. The wakeup initiation sub-circuit generates a clock request and disables a sleep mode indicator based on the comparator output. This allows the resources needed to execute the scheduled event to be fully transitioned from sleep mode to active mode before the scheduled event, such that the processor can execute the scheduled event promptly.

Figure 1:
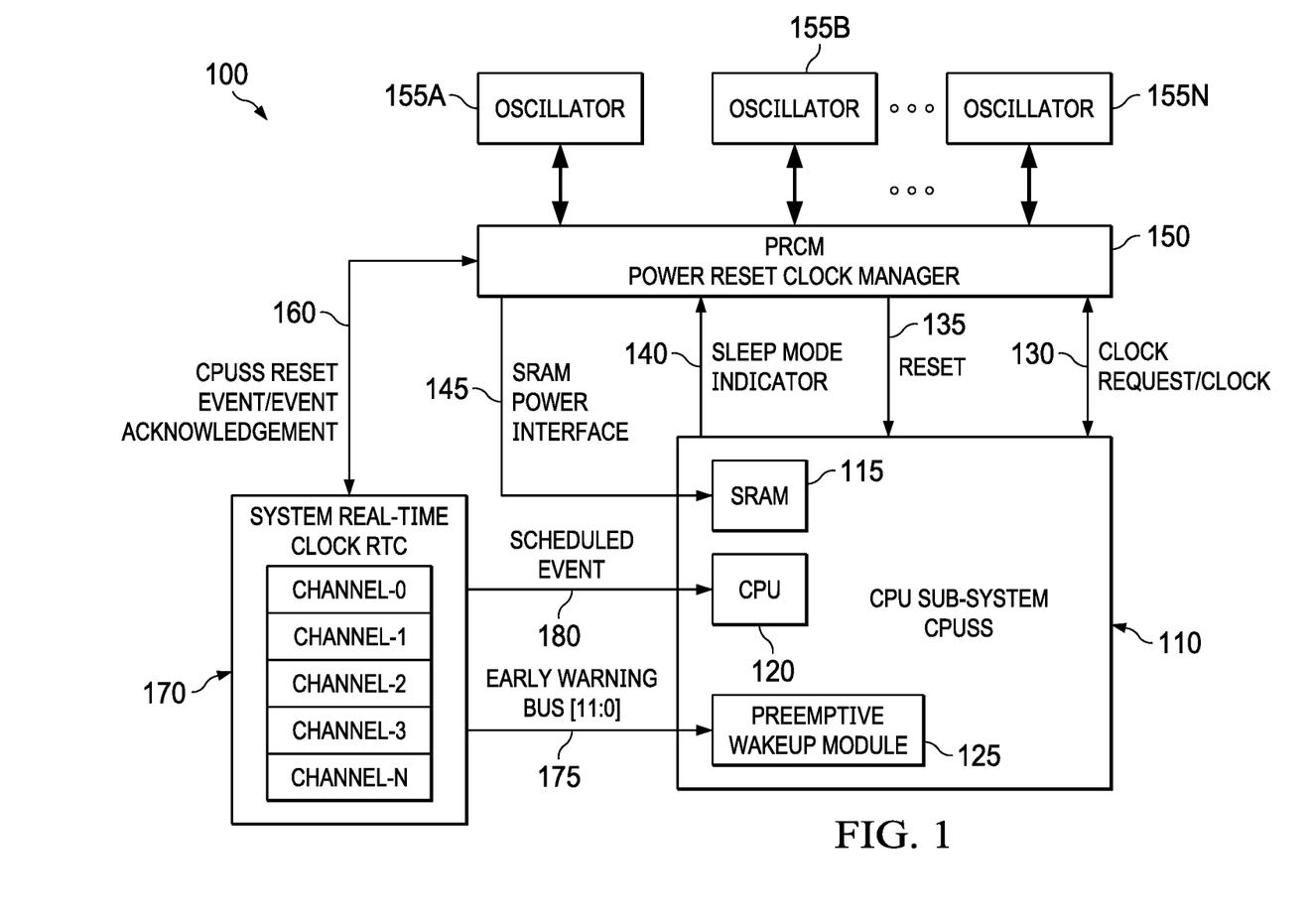
FIG. 1 is an example device configured for preemptive wakeup of a processing unit from low power modes.

FIG. 1 is an example device 100 configured for preemptive wakeup of a processing unit 120 from low power modes. The device 100 includes a central processing unit sub-system (CPUSS) 110, a power reset clock manager (PRCM) 150, and a system real-time clock (RTC) 170. CPUSS 110 includes a static random-access memory (SRAM) 115, a central processing unit 120, and a preemptive wakeup module 125. The terms "central processing unit" and "CPU" (singular) are used herein to refer to either a single or multiple processing units, and to broadly describe central processing units, digital signal processors, application specific integrated circuits, and the like. SRAM 115 is described as static random-access memory but any appropriate non-transitory storage medium may be used.

PRCM 150 provides power consumption control, clock control, and reset control for CPUSS 110. PRCM 150 receives a clock request from and provides a clock signal to CPUSS 110 through bus 130. PRCM 150 also receives a sleep mode indicator 140 from CPUSS 110, and provides a reset signal 135 to CPUSS 110. PRCM 150 also controls power to SRAM 115 via an SRAM power interface 145. PRCM 150 also causes oscillators 155A-N to power on or off, according to the clock needs of device 100, and provides the appropriate clock signal to components of device 100. For example, PRCM 150 causes oscillator 155A to power off in response to the clock signal generated by oscillator 155A no longer being needed by any component in device 100, and causes oscillator 155A to power on in response to a request for the clock signal generated by oscillator 155A. PRCM 150 also provides a CPUSS reset event signal to system RTC 170 through bus 160, which causes system RTC 170 to reset all the scheduled alarms stored in system RTC by CPUSS 110. After the channels are reset, system RTC 170 generates, and PRCM 150 receives, a CPUSS reset event acknowledgement signal through bus 160. PRCM 150 can then bring CPUSS 110 out of reset without later interference from residual scheduled alarms and events.

System RTC 170 operates in a real-time clock mode and provides wakeup signals and event triggers to components in device 100 in a sleep low power mode. An internal counter in system RTC 170 keeps a count of clock pulses related to the real-time, and compares the state of this internal counter with a count stored in one or more alarm registers. In example device 100, the alarm registers are labeled as channel-1 through channel-N. In response to the internal counter of system RTC 170 equaling a value some period of time before the scheduled alarm time, system RTC 170 generates an early warning countdown on bus 175, which decrements based on a low frequency clock, and provides it to the appropriate components within device 100. In response to the internal count equaling the scheduled alarm time, system RTC 170 generates a scheduled event signal 180 and provides it to the appropriate components within device 100.

CPUSS 110 owns one or more channels in system RTC 170 and programs the alarm times stored in the channels by a register write operation or the like. After scheduling the alarms, CPUSS 110 enters into a sleep mode, in which the clock request on bus 130 is turned off and PRCM 150 puts SRAM 115 into a retention state by adjusting power through SRAM power interface 145. CPUSS 110 provides a sleep mode indicator 140 to PRCM 150. The power supply to CPUSS 110 is left intact. In response to the internal counter of system RTC 170 equaling a value some period of time before the scheduled alarm time, system RTC 170 generates an early warning countdown decrementing based on a low frequency clock, and provides it to preemptive wakeup module 125 using early warning bus 175. In example device 100, system RTC 170 generates a twelve-bit wide early warning countdown decrementing based on a 32 kiloHertz (kHz) clock, in response to the count equaling approximately four milliseconds before the scheduled alarm time.

In response to receiving the early warning countdown over bus 175 from system RTC 170, preemptive wakeup module 125 determines which resources are needed to perform the event associated with the alarm, and determines which resource has the longest wakeup time. As will be discussed further herein with reference to FIG. 3, preemptive wakeup module 125 determines which resource takes the longest to transition from sleep mode to awake mode, and preemptively wakes the needed resources at a time before the scheduled event corresponding to the longest wakeup time. This ensures the necessary resources are fully awake and accessible before the scheduled event but not so far in advance as to greatly impact the power consumption of CPUSS 110 in low power mode.

Preemptive wakeup module 125 then compares the longest wakeup time to a value of the early warning countdown on bus 175. In the penultimate period of the low frequency clock and the early warning countdown on bus 175, system RTC 170 decrements the early warning countdown more quickly, based on a higher frequency clock. In example device 100, system RTC 170 decrements the early warning countdown on bus 175 every microsecond, based on a 1 MHz clock, for the 32 microseconds before the scheduled alarm time. In response to the value of the early warning countdown on bus 175 being equal to the longest wakeup time, preemptive wakeup module 125 triggers a clock request to PRCM 150 for an appropriate clock signal, and turns off a sleep mode indicator from CPUSS 110 to PRCM 150, prompting wakeup of CPUSS 110.

In response to its internal counter value equaling the stored alarm time, system RTC 170 generates a scheduled event signal 180 and provides it to CPU 120. CPU 120 then performs the operations indicated by the scheduled event signal 180. Because preemptive wakeup module 125 triggers wakeup of CPUSS 110 at the required wakeup time before the scheduled alarm time, the resources needed to process the event associated with the alarm are fully transitioned from sleep mode to awake mode by the time CPU 120 receives scheduled event signal 180. Thus, CPU 120 may immediately begin processing the scheduled event, without a delay while other components of CPUSS 110 are awakened from sleep mode.

Figure 2:
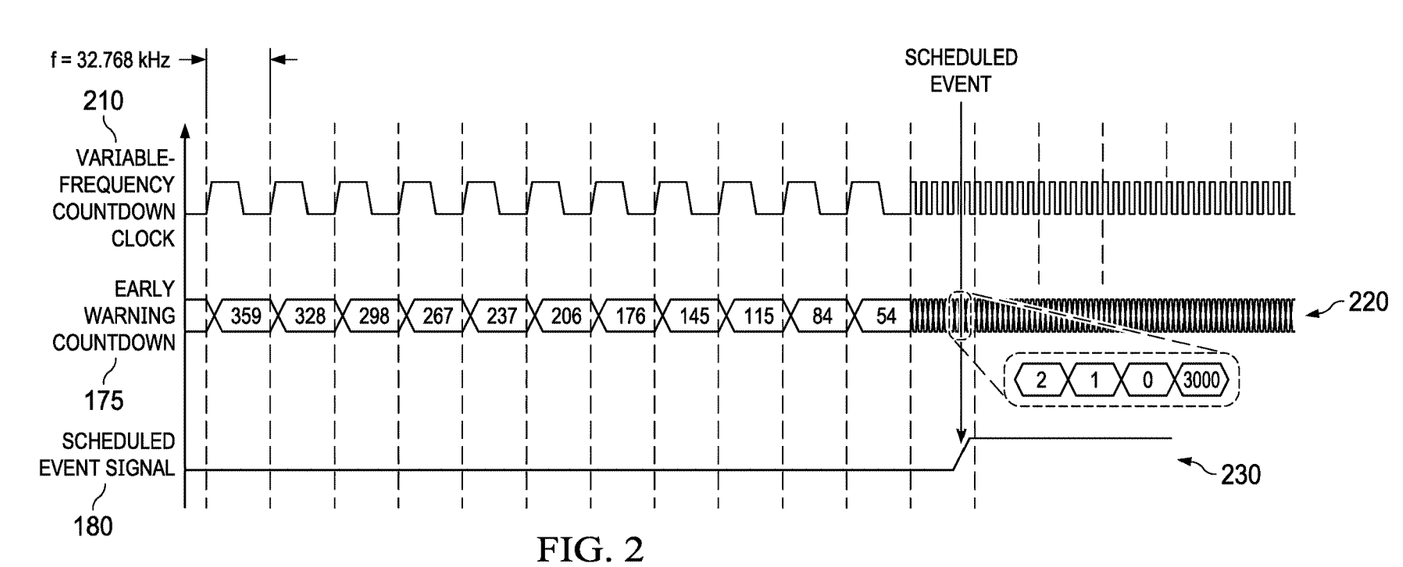
FIG. 2 illustrates a timing diagram for components in the example device shown in FIG. 1.

FIG. 2 illustrates a timing diagram for components in the example device 100 shown in FIG. 1. Graph 210 shows the variable-frequency countdown clock based on which the early warning countdown decremented. In this example, the early warning countdown has a total duration of four milliseconds, or 128 low frequency clock periods for a 32 kHz low frequency clock. For simplicity, only the last twelve of the 128 low frequency clock periods are shown, the last of which illustrates the increase in clock frequency to decrement the early warning countdown faster. Graph 220 shows the decrementing value on the twelve-bit early warning countdown bus 175 from system RTC 170 to preemptive wakeup module 125. Graph 230 shows scheduled event signal 180 from system RTC 170 to CPU 120.

Early warning bus 175 runs from system RTC 170 to preemptive wakeup module 125 in CPUSS 110, decrementing an early warning countdown in anticipation of the scheduled wakeup event. After decrementing based on the lower 32 kHz frequency for 127 clock cycles, eleven of which are shown in graph 220, the early warning countdown on bus 175 decrements more quickly based on a higher frequency clock, 1 MHz for example device 100. The use of a low frequency clock for the first eleven bits and a high frequency clock for only the last bit of the twelve-bit early warning bus 175 reduces the power used by clocks within device 100 compared to using the high frequency clock for all twelve bits of the early warning bus 175.

Preemptive wakeup module 125 in CPUSS 110 compares the value of early warning countdown 175 to the longest wakeup time for resources needed to perform the event for which the alarm is scheduled, and causes those resources to begin wakeup from sleep mode in response to the value of the early warning countdown on bus 175 equaling the longest wakeup time. This allows enough time for the necessary resources to fully transition from sleep mode to active mode before the scheduled event, while also keeping them in sleep mode for as long as possible. After the twelve-bit early warning countdown on bus 175 finishes, system RTC 170 generates and sends scheduled event signal 180 to CPU 120, which performs the intended operations.

Figure 3:
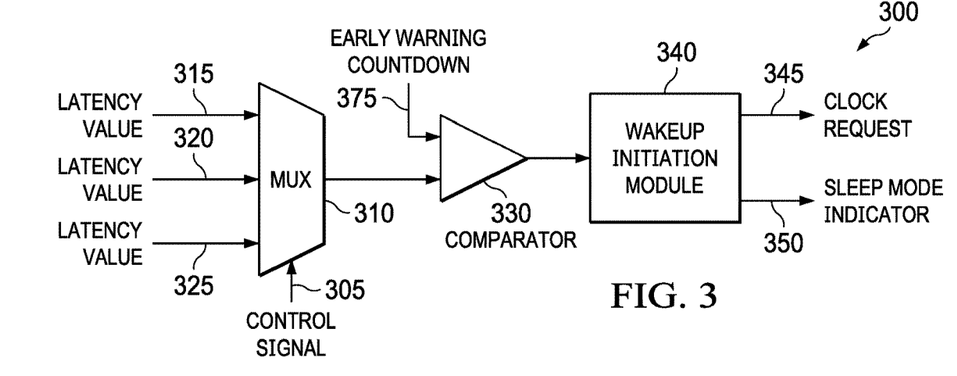
FIG. 3 illustrates an example preemptive wakeup module.

FIG. 3 illustrates an example preemptive wakeup module 300, such as preemptive wakeup module 125 in example device 100 shown in FIG. 1. Preemptive wakeup module 300 includes multiplexor 310, comparator 330, and wakeup initiation module 340. Multiplexor 310 receives latency values 315-325 from registers containing known wakeup times for resources within and used by the CPUSS associated with preemptive wakeup module 300. For example, latency value 315 can be a value of one microsecond, corresponding to a wakeup time for a 10 GHz clock used by the associated CPUSS. Latency value 320 can be a value of two microseconds, corresponding to a wakeup time for a 20 GHz clock used by the associated CPUSS. Latency value 325 can be a value of 3.5 microseconds, corresponding to a wakeup time for an SRAM associated with the CPUSS to transition from a retention state to an active state. Multiplexor 310 includes three inputs, but any number of inputs can be used according to the particular implementation.

Multiplexor 310 receives a control signal 305 indicating the particular input that multiplexor 310 should output. Control signal 305 indicates which resource used by the CPUSS to perform the scheduled event has the longest wakeup time. For example, the CPU will use the 10 GHz clock and the SRAM to perform the scheduled event. Because the SRAM has a longer wakeup time than the 10 GHz clock, 3.5 microseconds compared to one microsecond, control signal 305 indicates multiplexor 310 should output latency value 325. Although example preemptive wakeup module 300 includes a multiplexor, any appropriate selector logic circuit can be used based on the particular implementation.

Comparator 330 compares the output of multiplexor 310 to the value of a system RTC early warning countdown 375, such as the early warning countdown provided on bus 175 from system RTC 170 shown in FIG. 1. Wakeup initiation module 340 receives the output of comparator 330, and generates the appropriate clock request 345 to a power reset clock manager associated with the CPUSS and turns off a sleep mode indicator 350 from the CPUSS to the power reset clock manager. The power reset clock manager then provides the appropriate clock signal and transitions the SRAM from retention mode to active mode. As a result of preemptive wakeup module 300 and the system RTC early warning countdown 375, the resources needed for the scheduled event are fully awake and accessible for the CPU to use upon receiving the scheduled event signal, without a wakeup latency. Preemptive wakeup module 300 ensures the necessary resources are fully awake and accessible before the scheduled event but not so far in advance as to greatly impact the power consumption of the CPUSS and reduce the effectiveness of the low power mode.

Figure 4:
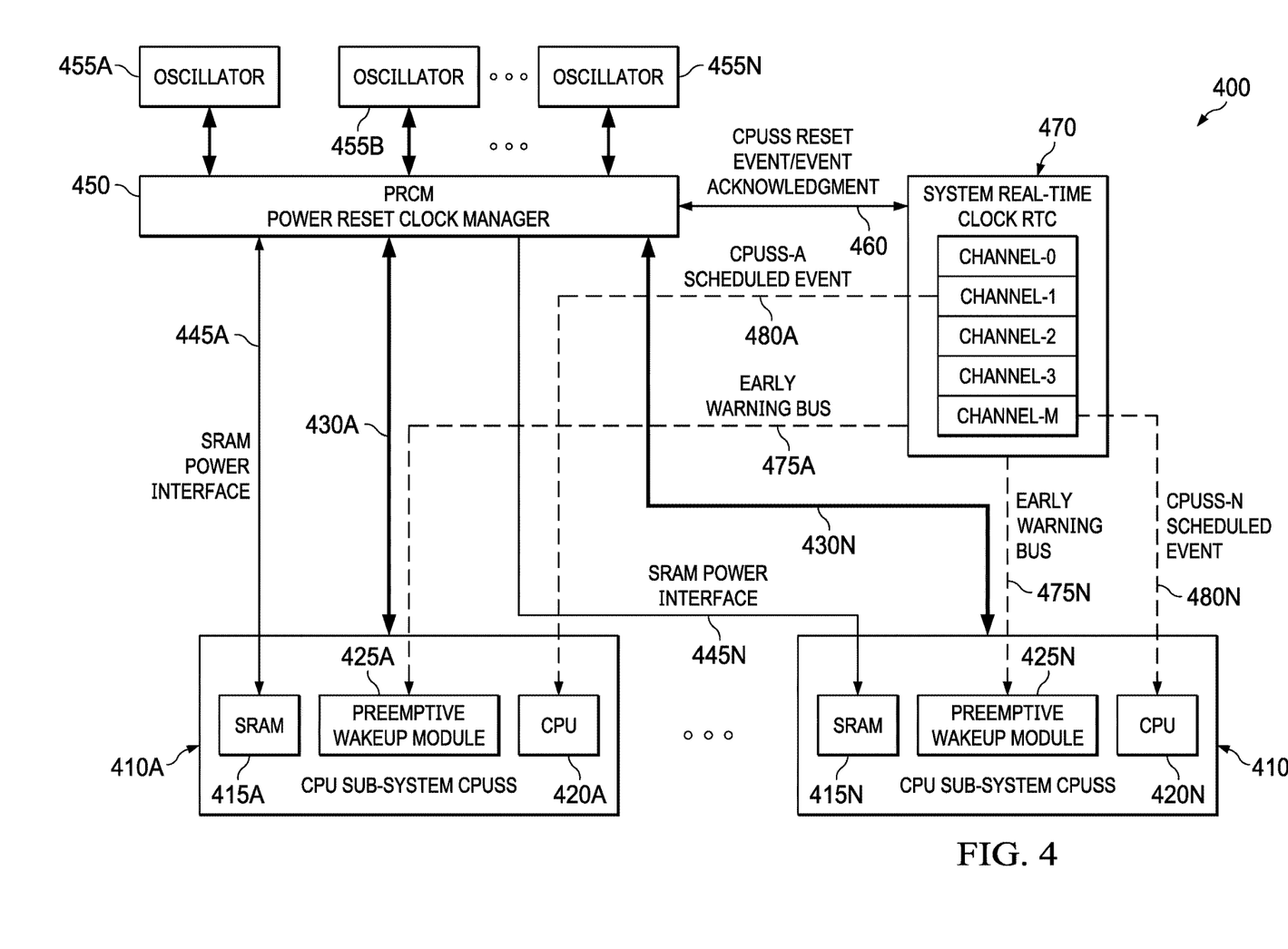
FIG. 4 illustrates an example device configured for preemptive wakeup of multiple processing units from low power modes.

FIG. 4 illustrates an example device 400 configured for preemptive wakeup of multiple processing units from low power modes. Example device 400 is similar to example device 100 shown in FIG. 1, but whereas example device 100 includes only a single CPUSS 110, example device 400 includes multiple CPUSS 410A-N. Device 400 includes power reset clock manager (PRCM) 450 and a system real-time clock (RTC) 470. Bus 430A allows PRCM 450 and CPUSS 410A to send and receive clock signals and clock requests, reset signals, and sleep mode indications. Similarly, bus 430N allows PRCM 450 and CPUSS 410N to send and receive clock signals and clock requests, reset signals, and sleep mode indications. PRCM 450 controls power to SRAM 415A in CPUSS 410A via SRAM power interface 445A. PRCM 450 controls power to SRAM 415N in CPUSS 410N via SRAM power interface 445N.

System RTC 470 includes channels 1-M. The number of channels in system RTC 470 need not equal the number of CPUSS 410 included in example device 400, as each CPUSS 410 can own multiple channels at a time. This allows each CPUSS 410 to schedule a number of events and alarm times, and have several scheduled events pending at a time. Only a single early warning bus for the particular CPUSS 410 is needed, regardless of the number of channels owned by the CPUSS 410, reducing the number of channels and communication buses needed within device 400 compared to devices that implement two channels for each scheduled event—one for the early wakeup event and one for the scheduled event itself. The early warning bus associated with the particular CPUSS 410 indicates the time delay to the next upcoming scheduled event.

Ownership of channels within system RTC 470 can be subject to security rules and peripheral firewalls such that a CPUSS 410 cannot overwrite or disturb channels owned by a different CPUSS 410. System RTC 470 is coupled to each CPUSS 410A-N by a unique early warning bus 475A-N. Bus 460 carries CPUSS reset event signals from PRCM 450 to system RTC 470, and reset event acknowledgement signals from system RTC 470 to PRCM 450. The reset event signals from PRCM 450 can indicate a particular CPUSS 410 to be reset, and system RTC 470 resets only the channels owned by the particular CPUSS 410.

Figure 5:
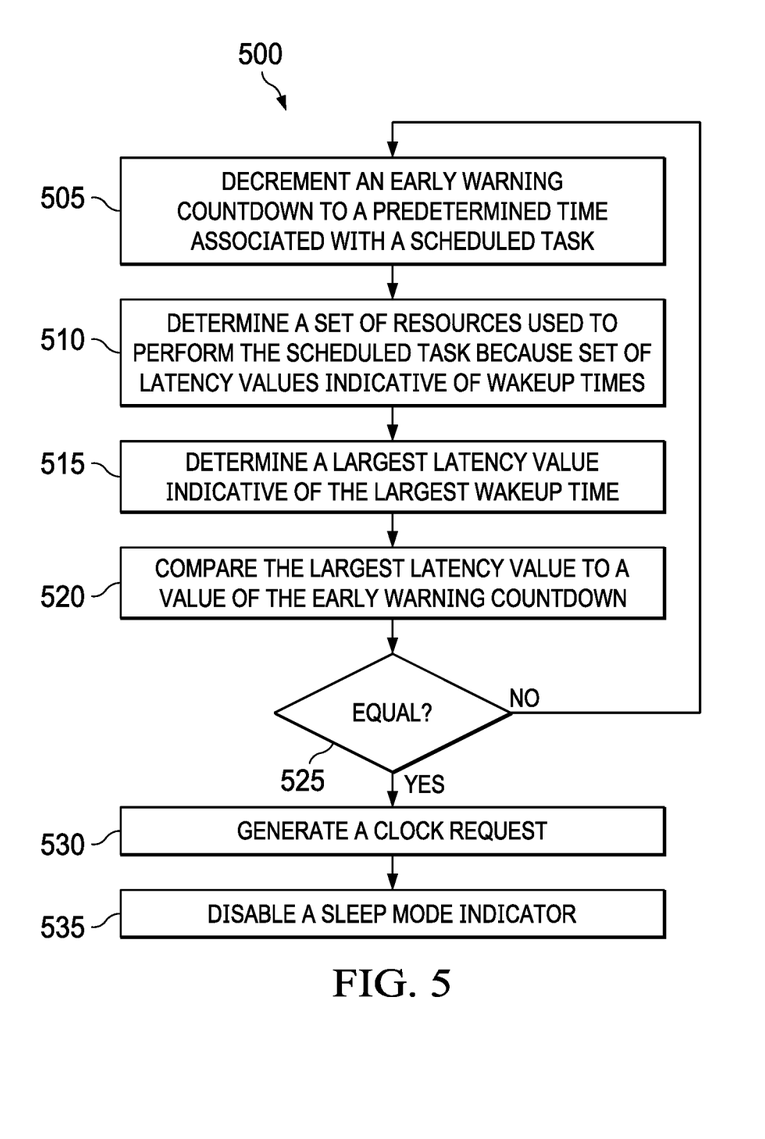
FIG. 5 illustrates, in flow chart form, an example process for preemptive wakeup of a processing unit from low power modes.

FIG. 5 illustrates, in flow chart form, an example process 500 for preemptive wakeup of a processing unit from low power modes, such as CPUSS 110 and electronic device 100 shown in FIG. 1. Process 500 is performed by a processing unit executing instructions stored in a non-transitory computer readable medium, such as CPUSS 110 executing instructions stored in SRAM 115 from electronic device 100. The flow chart begins at operation 505, during which RTC 170 decrements an early warning countdown to a predetermined time associated with a scheduled task. At operation 510, preemptive wakeup module 125 determines a set of resources needed to perform the scheduled task. At operation 515, preemptive wakeup module 125 determines a largest latency value indicative of the longest wakeup time.

At operation 520, preemptive wakeup module 125 compares the largest latency value to a value of the early warning countdown. At operation 525, preemptive wakeup module 125 determines whether the value of the early warning countdown is equal to the largest latency value. If the value of the early warning countdown is not equal to the largest latency value, system RTC 170 continues to decrement the early warning countdown and preemptive wakeup module 125 compares the largest latency value and a value of the early warning countdown again, until the two are equal. In response to the largest latency value and the value of the early warning countdown being equal, preemptive wakeup module 125 generates a clock request at operation 530 and disables a sleep mode indicator at operation 535.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. An electronic circuit comprising:
   a real-time clock (RTC) sub-system configured to generate an early warning countdown value based on a specified time to execute a task;
   a memory coupled to the RTC sub-system;
   a preemptive wakeup circuit coupled to the RTC sub-system, wherein the preemptive wakeup circuit is configured to receive latency values indicative of respective wakeup times for the memory and a clock generator; receive a selector signal indicating a largest latency value, from among the latency values, indicative of a longest wakeup time to output, output a signal indicating that the early warning countdown value is equal to the largest latency value, and disable a sleep mode indicator based on the early warning countdown value; and
   a power controller configured to wake the memory based on the sleep mode indicator.

2. The electronic circuit of claim 1, wherein the power controller is configured to transition the memory to a retention mode based on the sleep mode indicator.

3. The electronic circuit of claim 1, wherein the power controller is configured to transition the memory to an active mode based on the sleep mode indicator being disabled by the preemptive wakeup circuit.

4. The electronic circuit of claim 1, wherein the preemptive wakeup circuit comprises:
   a selector logic circuit configured to receive the latency values, and to receive the selector signal;
   a comparator coupled to the selector logic circuit, wherein the comparator is configured to output the signal indicating that the early warning countdown value is equal to the largest latency value; and
   a wakeup initiation circuit coupled to the comparator, wherein the wakeup initiation circuit is configured to disable the sleep mode indicator.

5. The electronic circuit of claim 1, wherein the RTC sub-system is configured to decrement the early warning countdown value based on a first clock frequency for a first portion of time and based on a second clock frequency for a second portion of time, wherein the second clock frequency is higher than the first clock frequency.

6. The electronic circuit of claim 5, wherein the early warning countdown value is twelve bits.

7. The electronic circuit of claim 5, wherein the second portion of time is shorter than the first portion of time.

8. The electronic circuit of claim 1, wherein the RTC sub-system comprises a real-time clock configured to generate the early warning countdown value.

9. The electronic circuit of claim 1, further comprising a processor configured to write the specified time to the RTC sub-system.

10. The electronic circuit of claim 1,
    wherein the RTC sub-system comprises an alarm register configured to store the specified time,
    wherein the RTC sub-system is coupled to the power controller, and
    wherein the RTC sub-system is configured to clear the alarm register based on a reset signal.

11. The electronic circuit of claim 1,
    wherein the specified time is a first specified time,
    wherein the task is a first task,
    wherein the RTC sub-system comprises a first alarm register configured to store the first specified time, and
    wherein the RTC sub-system further comprises a second alarm register configured to store a second specified time to execute a second task.

12. The electronic circuit of claim 11, further comprising a processor,
    wherein the RTC sub-system further comprises a plurality of alarm registers including the first and second alarm registers, and
    wherein the processor is configured to write to a subset of the plurality of alarm registers.

13. The electronic circuit of claim 12,
    wherein the RTC sub-system is coupled to the power controller, and
    wherein the RTC sub-system is configured to clear the subset of the plurality of alarm registers based on a reset signal.

14. A method comprising:
    generating an early warning countdown value based on a specified time to execute a task;
    receiving latency values indicative of respective wakeup times for a memory and a clock generator;
    receiving a selector signal indicating a largest latency value, from among the latency values, indicative of a longest wakeup time to output;
    outputting a signal indicating that the early warning countdown value is equal to the largest latency value;
    disabling a sleep mode indicator based on the early warning countdown value; and
    waking the memory based on the sleep mode indicator.

15. The method of claim 14, further comprising transitioning the memory to a retention mode based on the sleep mode indicator.

16. The method of claim 14, further comprising transitioning the memory to an active mode based on a disabled state of the sleep mode indicator.

17. The method of claim 14, further comprising decrementing the early warning countdown value based on a first clock frequency for a first portion of time and based on a second clock frequency for a second portion of time,
   wherein the second clock frequency is higher than the first clock frequency, and
   wherein the second portion of time is shorter than the first portion of time.

18. The method of claim 14, further comprising clearing an alarm register based on a reset signal, wherein the alarm register stores the specified time.

19. The method of claim 14, further comprising writing to a subset of alarm registers, wherein each of the alarm registers stores a respective specified time to execute a unique task.

20. The method of claim 14, further comprising clearing the subset of alarm registers based on a reset signal.

\* \* \* \* \*